Patented July 7, 1936

2,046,875

UNITED STATES PATENT OFFICE 2,046,875

PREPARATION OF AROMATIC DITHIO-CARBAMATES

Paul C. Jones, Cuyahoga Falls, Ohio, assignor to The B. F. Goodrich Company, New York, N. Y., a corporation of New York No Drawing. Application August 16, 1935, Serial No. 36,553

6 Claims. (Cl. 260—112)

This invention relates to the preparation of N-diaryl dithiocarbamates. Salts of diaryl dithiocarbamic acids have heretofore been produced by the addition of carbon disulphide to certain metal compounds of diarylamines, particularly the sodium compound. These metal compounds are not only hard and intractable, so that effective contact with the carbon disulphide is somewhat difficult to attain, but are exceedingly reactive and decompose rapidly or even ignite spontaneously when in contact with the air. The chief object of this invention is to provide a new method for making diaryl dithiocarbamates which method does not involve the isolation and handling of highly reactive organic metal compounds.

In the process of this invention the diarylamine is dispersed in a liquid comprising carbon disulphide and a metal amide is added. The desired product is immediately formed by a reaction involving all three ingredients, without the appearance of the metal compound of the diarylamine heretofore used as an intermediate.

It is generally preferred to dissolve the diarylamine in pure carbon disulphide. The use of other inert solvents to dilute the carbon disulphide appears to offer no advantages over the use of carbon disulphide alone, but such other solvents as benzene, gasoline, ether, etc. may be added if desired. The carbon disulphide solution is then treated with a metal amide, preferably the amide of a metal having a positive electrode potential (relative to hydrogen) greater than two volts, that is, with an alkali or alkaline earth metal (including magnesium). The amides of these metals react readily at room temperature or only slightly elevated temperatures, so that the necessity for pressure equipment may generally be avoided. The metal amide, the carbon disulphide, and the diarylamine unite to form the metal salt of the corresponding diaryl dithiocarbamic acid in accordance with the following equation:

$$R_2NH + CS_2 + MNH_2 \rightarrow R_2N-CS-SM + NH_3$$

where R represents an aryl group and M represents an atom of a monovalent metal or a half atom of a bivalent metal.

The diarylamines used in this reaction may be either simple unsubstituted diarylamines such as diphenylamine, phenyl tolyl amine, phenyl cumyl amine, phenyl xenylamine, phenyl naphthylamine, phenyl anthracyl amine, ditolylamine, dixenylamine, dinaphthylamine, phenyl ar-tetrahydro-naphthylamine, di(ar-tetrahydro-naph- 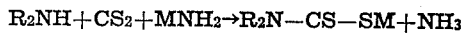thyl)amine, or amines containing substituents such as halogen, nitro, alkoxy, aryloxy, or secondary of tertiary amino groups, or even heterocyclic amines in which a secondary amino nitrogen is attached to two aromatic rings such as carbazole, o-imino dibenzyl, meso dimethyl acridane, etc. Additional secondary amino groups will generally participate in the reaction, giving compounds containing two or more dithiocarbamic groups. It is to be understood that the term "diarylamine", unless otherwise limited, is herein employed in a generic sense to embrace all the diarylamines and their derivatives and equivalents enumerated above.

As a specific example of one embodiment of the invention, 169 parts by weight of diphenylamine are dissolved in 500 parts of carbon disulphide and 43 parts (10% excess) of powdered sodamide are added. The heat of the reaction causes the mixture to boil spontaneously for approximately half an hour, during which time ammonia gas is given off. When the reaction is terminated, the insoluble sodium salt of diphenyl dithiocarbamic acid is filtered off, and if desired recrystallized from water. Other dithiocarbamates may be similarly prepared by substituting other diarylamines, with such changes in proportion and conditions as will be obvious to any chemist.

While I have herein disclosed with considerable particularity certain preferred manners of performing my invention, I do not thereby desire or intend to limit myself solely thereto, for, as hitherto stated, the precise conditions specified for the reaction may be varied, and other materials having equivalent chemical properties may be employed if desired without departing from the spirit and scope of the invention as defined in the appended claims.

I claim:

1. The method of making a diaryl dithiocarbamate which comprises dissolving a diarylamine in carbon disulphide and adding a metal amide.

2. The method of making a diaryl dithiocarbamate which comprises dissolving a diarylamine in carbon disulphide and adding an amide of a metal having an electrode potential greater than two.

3. The method of making a diaryl dithiocarbamate which comprises dissolving a diarylamine in carbon disulphide and adding an amide of an alkali metal.

4. The method of making a diaryl dithiocarbamate which comprises dissolving a di(aryl hydrocarbon) amine in carbon disulphide and adding an amide of an alkali metal.

5. The method of making a diaryl dithiocarbamate which comprises dissolving a di-(aryl hydrocarbon) amine in carbon disulphide and adding sodamide.

6. The method of making sodium diphenyl dithiocarbamate which comprises dissolving diphenylamine in carbon disulphide and adding sodamide.

PAUL C. JONES.